US009685073B2

(12) United States Patent
Lickfelt

(10) Patent No.: US 9,685,073 B2
(45) Date of Patent: Jun. 20, 2017

(54) SYSTEMS AND METHODS THAT ENABLE SELECTING A RANGE FOR TWO-WAY WIRELESS COMMUNICATION BETWEEN A KEY FOB AND A VEHICLE

(71) Applicant: Brian K. Lickfelt, Powell, OH (US)

(72) Inventor: Brian K. Lickfelt, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 149 days.

(21) Appl. No.: 14/151,292

(22) Filed: Jan. 9, 2014

(65) Prior Publication Data

US 2015/0194049 A1    Jul. 9, 2015

(51) Int. Cl.
*G08C 19/00* (2006.01)
*G08C 17/02* (2006.01)
*B60R 25/24* (2013.01)
*B60R 25/40* (2013.01)
*B60R 25/10* (2013.01)

(52) U.S. Cl.
CPC ............. *G08C 17/02* (2013.01); *B60R 25/24* (2013.01); *B60R 25/1003* (2013.01); *B60R 25/406* (2013.01)

(58) Field of Classification Search
CPC ........ B60R 2325/101; B60R 2325/105; B60R 2325/202; B60R 2325/205; B60R 25/04; B60R 25/24; B60R 25/102; B60R 25/209; B60R 25/241; B60R 25/406; B60R 25/1003; B60R 25/2009; B60R 25/2081; G07C 2009/00261; G07C 2009/00206; G07C 2009/00357; G07C 2009/00476; G07C 2009/00507; G07C 2009/00587; G07C 2009/00793; G07C 2009/00841; G08C 17/02; G01S 13/74; H01Q 1/3241
USPC ............ 340/5.61, 5.64, 5.72, 426.13, 426.14
See application file for complete search history.

(56) References Cited

U.S. PATENT DOCUMENTS

| | | | | |
|---|---|---|---|---|
| 5,146,215 | A * | 9/1992 | Drori ................. | B60R 25/1004 340/426.14 |
| 5,517,189 | A * | 5/1996 | Bachhuber ......... | G07C 9/00182 340/5.64 |
| 5,600,323 | A * | 2/1997 | Boschini ...................... | 341/173 |
| 6,323,566 | B1 * | 11/2001 | Meier .......................... | 307/10.2 |
| 6,621,406 | B2 * | 9/2003 | Kumano ............... | B60R 25/245 307/10.1 |
| 6,624,758 | B1 | 9/2003 | Omara et al. | |
| 6,785,595 | B2 * | 8/2004 | Kominami .......... | B60N 2/0248 340/426.25 |
| 7,292,134 | B2 | 11/2007 | Conner et al. | |
| 7,397,344 | B2 * | 7/2008 | Nantz et al. ................ | 340/5.72 |
| 7,504,931 | B2 | 3/2009 | Nguyen | |
| 7,629,873 | B2 * | 12/2009 | Ghabra et al. ............... | 340/5.25 |
| 7,629,876 | B2 | 12/2009 | Nagai et al. | |
| 7,653,463 | B2 | 1/2010 | DiCroce | |
| 7,683,756 | B2 * | 3/2010 | Ghabra et al. ............... | 340/5.61 |
| 7,944,340 | B1 * | 5/2011 | Ghabra et al. ............. | 340/12.22 |

(Continued)

*Primary Examiner* — John A Tweel, Jr.
*Assistant Examiner* — Adnan Aziz
(74) *Attorney, Agent, or Firm* — Armstrong Teasdale LLP

(57) ABSTRACT

A computing device for use in selecting a range for communication between a key fob and a vehicle is described. The computing device is located in the vehicle. The computing device is configured to receive a designation of a desired range for communication between the vehicle and the key fob, and transmit a signal corresponding to the designated range to the key fob.

20 Claims, 5 Drawing Sheets

(56) References Cited

U.S. PATENT DOCUMENTS

| | | | |
|---|---|---|---|
| 8,249,802 B2 | 8/2012 | Lickfelt et al. | |
| 8,269,601 B2 | 9/2012 | Burzio | |
| 8,473,153 B1 | 6/2013 | Lickfelt | |
| 8,847,731 B2* | 9/2014 | Tieman | 340/5.62 |
| 2001/0038328 A1* | 11/2001 | King et al. | 340/5.64 |
| 2002/0025823 A1* | 2/2002 | Hara | B60R 25/24 455/456.5 |
| 2003/0020601 A1* | 1/2003 | Caren | 340/425.5 |
| 2003/0117261 A1* | 6/2003 | Gunsch | 340/5.25 |
| 2005/0134477 A1* | 6/2005 | Ghabra | B60R 25/246 340/13.24 |
| 2006/0061458 A1* | 3/2006 | Simon | B60R 25/04 340/426.35 |
| 2006/0091997 A1* | 5/2006 | Conner et al. | 340/5.64 |
| 2006/0202798 A1* | 9/2006 | Baumgartner et al. | 340/5.61 |
| 2007/0024416 A1* | 2/2007 | Tang | B60R 25/245 340/5.61 |
| 2008/0079602 A1* | 4/2008 | King et al. | 340/825.69 |
| 2009/0224876 A1* | 9/2009 | McCall | B60R 25/2009 340/5.61 |
| 2009/0243796 A1* | 10/2009 | Tieman | B60R 25/24 340/5.72 |
| 2010/0075655 A1* | 3/2010 | Howarter | B60R 25/2009 455/420 |
| 2010/0134240 A1* | 6/2010 | Sims | G08C 17/02 340/5.1 |
| 2011/0014869 A1* | 1/2011 | Nakajima | H04B 5/0062 455/41.2 |
| 2011/0057817 A1* | 3/2011 | Proefke | G01S 13/74 340/989 |
| 2012/0313768 A1* | 12/2012 | Campbell | B60R 25/24 340/438 |
| 2013/0137372 A1* | 5/2013 | Nishidai | H04B 5/00 455/41.1 |
| 2013/0142269 A1* | 6/2013 | Witkowski | H04B 7/0689 375/259 |
| 2015/0304800 A1* | 10/2015 | Son | H04B 7/24 455/41.2 |

* cited by examiner

SYSTEMS AND METHODS THAT ENABLE SELECTING A RANGE FOR TWO-WAY WIRELESS COMMUNICATION BETWEEN A KEY FOB AND A VEHICLE

BACKGROUND

The field of the disclosure relates generally to vehicles, and more particularly, to systems and methods that enable two-way wireless communication between a key fob and a vehicle.

In some known systems that enable two-way wireless communication between a key fob and a vehicle, a transmission range between the key fob and the vehicle is fixed, such that a user of the key fob may only transmit a signal to, or receive a signal from, the vehicle when the user is within the fixed range from the vehicle. If the range is relatively short, then the life of a battery included in the key fob is relatively long. Conversely, if the range is relatively long, the life of the battery is generally relatively short. Given that different users may have different preferences on battery life and communication range, a system that would enable a user to select a range for two-way communication between the key fob and the vehicle would be beneficial.

BRIEF DESCRIPTION

In one aspect, a computing device for use in selecting a range for communication between a key fob and a vehicle is provided. The computing device is located in the vehicle. The computing device is configured to receive a designation of a desired range for communication between the vehicle and the key fob, and transmit a signal corresponding to the designated range to the key fob.

In another aspect, a method for use in selecting a range for communication between a key fob and a vehicle is provided. The method includes receiving, at the key fob, a signal corresponding to a designated communication range, and transmitting signals at a power level associated with the designated communication range.

In another aspect, a key fob is provided. The key fob includes a transceiver configured to transmit and receive signals, and a processor coupled to said transceiver and configured to control a power level at which the transceiver operates, based at least partially on a user-selectable communication range.

DETAILED DESCRIPTION

Figure 1:
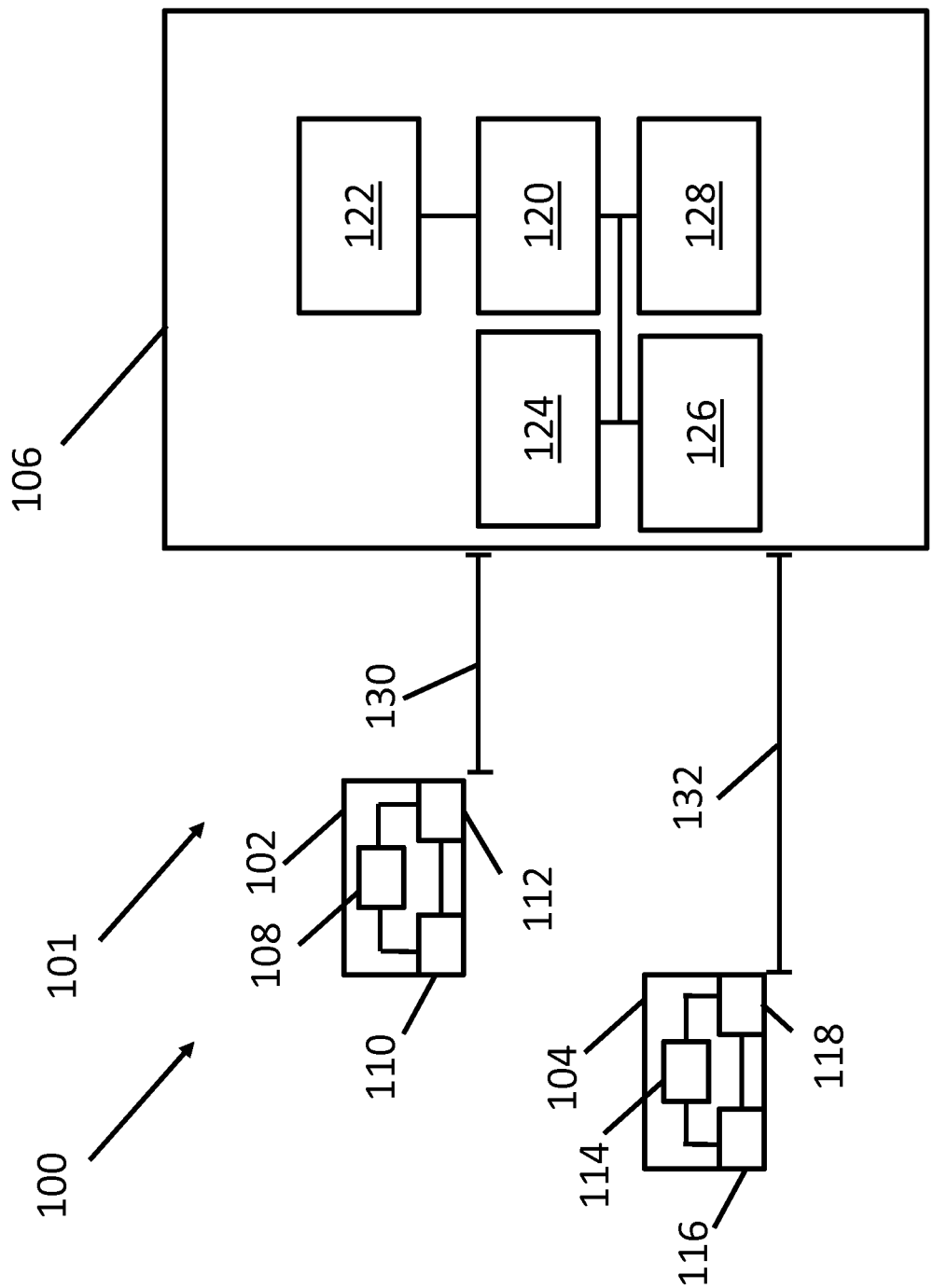
FIG. 1 is a block diagram of an example environment in which a plurality of key fobs wirelessly communicate with a vehicle, in accordance with one aspect of the present disclosure.

Implementations of methods and systems described herein facilitate selecting a range for two-way communication between a key fob and a vehicle. A user interface displayed by a display device in the vehicle allows a user of the key fob to designate a range for two-way communication between the key fob and the vehicle. Subsequently, a signal corresponding to the designated range is transmitted from the vehicle to the key fob. For example, the key fob may transmit an operational command signal that includes an operational command to the vehicle, then after a predetermined period of time has passed, the key fob may transmit a status fetch command signal that includes a status fetch command to the vehicle to determine whether the operational command was successfully performed. In response to receiving the status fetch command signal, the vehicle transmits a status fetch response signal that includes a status fetch response and includes a signal corresponding to the designated range. The key fob receives the status fetch response signal and stores the designated range and/or a transmission power level associated with the designated range. The key fob controls or limits a level of power used by a transceiver in the key fob based on the designated range.

In some implementations, a plurality of key fobs communicate with the vehicle and each key fob has a two-way communication range associated with it, such that a first key fob transmits signals to the vehicle at a first range, and a second key fob transmits signals to the vehicle at a second range. The first range and the second range may be different. Accordingly, the expected life of a battery in the first key fob may be different than the expected life of the battery in the second key fob.

In one implementation, a computer program is provided, and the program is embodied on a computer-readable medium. The program is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

FIG. 1 is a block diagram of an example environment 100 in which a plurality of key fobs 102 and 104 wirelessly communicate with a vehicle 106, in accordance with one aspect of the present disclosure. A two-way communication system 101 includes at least first key fob 102 and vehicle 106, which is configured to receive signals from and transmit signals to key fob 102. Two-way communication system 101 may include additional key fobs, for example second key fob 104. First key fob 102 includes a computing device 108 coupled to a battery 110 and to a transceiver 112. Additionally, battery 110 is coupled to transceiver 112. Likewise, second key fob 104 includes a computing device 114 coupled to a battery 116 and to a transceiver 118. Additionally, battery 116 is coupled to transceiver 118. Vehicle 106 includes a computing device 120. Computing device 120 is coupled to an engine 122, a locking device 124, a transceiver 126, and a display device 128. For example, computing device 120 may be communicatively coupled to engine 122, locking device 124, transceiver 126, and/or display device 128 by a controller area network (CAN) bus included in vehicle 106. First key fob 102 communicates with vehicle 106 at a first range 130. More specifically, first key fob 102 is configured to transmit signals having a suitable strength to be received by vehicle 106 when vehicle 106 is within a first range 130 of key fob 102. Similarly, second key fob 104 communicates with vehicle 106 when they are within a second range 132. First range 130 may be equal to or different from second range 132, as described in more detail herein. Accordingly, if first range 130 is different from second range 132, a life of battery 110 may differ from a life of battery 116, provided that first key fob 102 and second key fob 104 are used an equal amount and the batteries 110 and 116 initially store the same amount of energy.

First key fob 102 may transmit an operational command signal that includes an operational command, such as a command to start engine 122, to lock locking device 124, or to unlock locking device 124. More specifically, computing device 108 causes transceiver 112 to transmit the operational command signal to vehicle 106. Computing device 120 receives the transmitted operational command signal through transceiver 126 and causes engine 122 to start or locking device 124 to lock or unlock in accordance with the received signal. After a predetermined amount of time elapses (e.g., 5 seconds), first key fob 102 transmits a status fetch command signal including a status fetch command to vehicle 106. Computing device 120 receives the status fetch command signal through transceiver 126 and transmits a status fetch response signal that includes a status fetch response to first key fob 102 through transceiver 126. The status fetch response signal may include, for example, an indication that the received operational command was successfully performed, an indication that the received operational command was not successfully performed, or an indication that the received operational command is being performed. Additionally, the status fetch response signal may include additional data, for example one or more settings to be used to configure a feature or operation of first key fob 102. More specifically, the one or more settings may include a designated range for first key fob 102 to transmit and receive signals at. After receiving the designated range in the signal, computing device 108 controls transceiver 112 to transmit and receive signals at the designated range. More specifically, computing device 108 controls or limits a power level used by transceiver 112 based on the designated range. Computing device 108 may be configured to receive a payload in a status fetch response signal from vehicle 106, wherein the payload includes a bit corresponding to the user-selectable communication range. A similar process may occur for second key fob 104. In some implementations, rather than transmitting a signal corresponding to the designated range in response to a status fetch command signal, computing device 120 of vehicle 106 transmits the signal corresponding to the designated range to first key fob 102 or second key fob 104 at a different time. As described in more detail herein, the designated range may be specific to a particular key fob (e.g., first key fob 102) rather than to all key fobs configured to communicate with vehicle 106.

Figure 2:
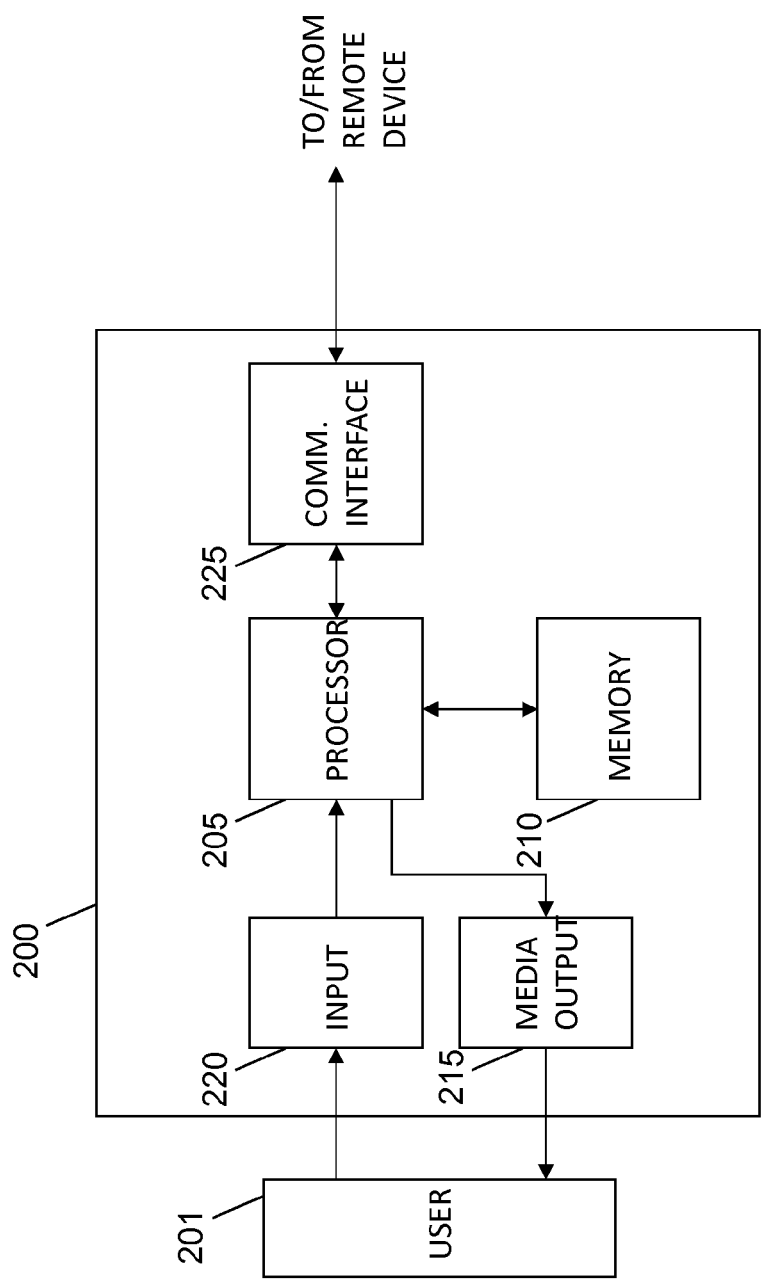
FIG. 2 is a block diagram of an example configuration of a computing device that may be included in the vehicle of FIG. 1, in accordance with one aspect of the present disclosure.

FIG. 2 is a block diagram of an example configuration of a computing device 200 that may be included in key fobs 102, 104 and vehicle 106 (FIG. 1), in accordance with one aspect of the present disclosure. More specifically, computing devices 108, 114, and 120 may be implementations of computing device 200. Computing device 200 includes a processor 205 for executing instructions. In some embodiments, executable instructions are stored in a memory area 210. Processor 205 may include one or more processing units (e.g., in a multi-core configuration). Memory area 210 is any device allowing information such as executable instructions and/or other data to be stored and retrieved. Memory area 210 may include one or more computer-readable media.

Computing device 200 also includes at least one media output component 215 for presenting information to user 201. Media output component 215 is any component capable of conveying information to user 201. In some embodiments, media output component 215 includes an output adapter such as a video adapter and/or an audio adapter. The output adapter is operatively coupled to processor 205 and operatively couplable to an output device such as a display device. For example, media output component 215 may include or be communicatively coupled to display device 128 (shown in FIG. 1) which may include a liquid crystal display (LCD), a thin-film transistor liquid crystal display (TFT-LCD), a light emitting diode display (LED), a heads-up display, an organic light emitting diode (OLED) display, cathode ray tube (CRT), an "electronic ink" display, and/or any other type of display that allows two-way communication system 101 to function as described herein.

In some embodiments, computing device 200 includes an input device 220 for receiving input from user 201. Input device 220 may include, for example, a button or plurality of buttons, a dial, a touch sensitive panel (e.g., a touch pad or a touch screen), a gyroscope, an accelerometer, a position detector, or an audio input device. A single component such as a touch screen may function as both an output device of media output component 215 and input device 220. For example, display device 128 (FIG. 1) may function as both an output device of media output component 215 and input device 220.

Computing device 200 may also include a communication interface 225, which is communicatively couplable to a remote device, for example but not limited to engine 122, locking device 124, and transceivers 112, 118, 126. Communication interface 225 may include, for example, a wired or wireless network adapter or a wireless data transceiver. Examples of wireless communications may include radio frequency (RF), Bluetooth®, ZigBee®, near field communication (NFC), or any other wireless communication that allows two-way communication system 101 to function as described herein. Transceivers 112, 118, 126 may be included within or coupled to communication interface 225 of computing devices 108, 114, and 120, respectively.

Stored in memory area 210 are, for example, computer-readable instructions for providing a user interface to user 201 via media output component 215 and, optionally, receiving and processing input from input device 220. Additionally, memory area 210 may store designated ranges for first key fob 102 and second key fob 104 transmissions.

Memory area 210 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

Figure 3:
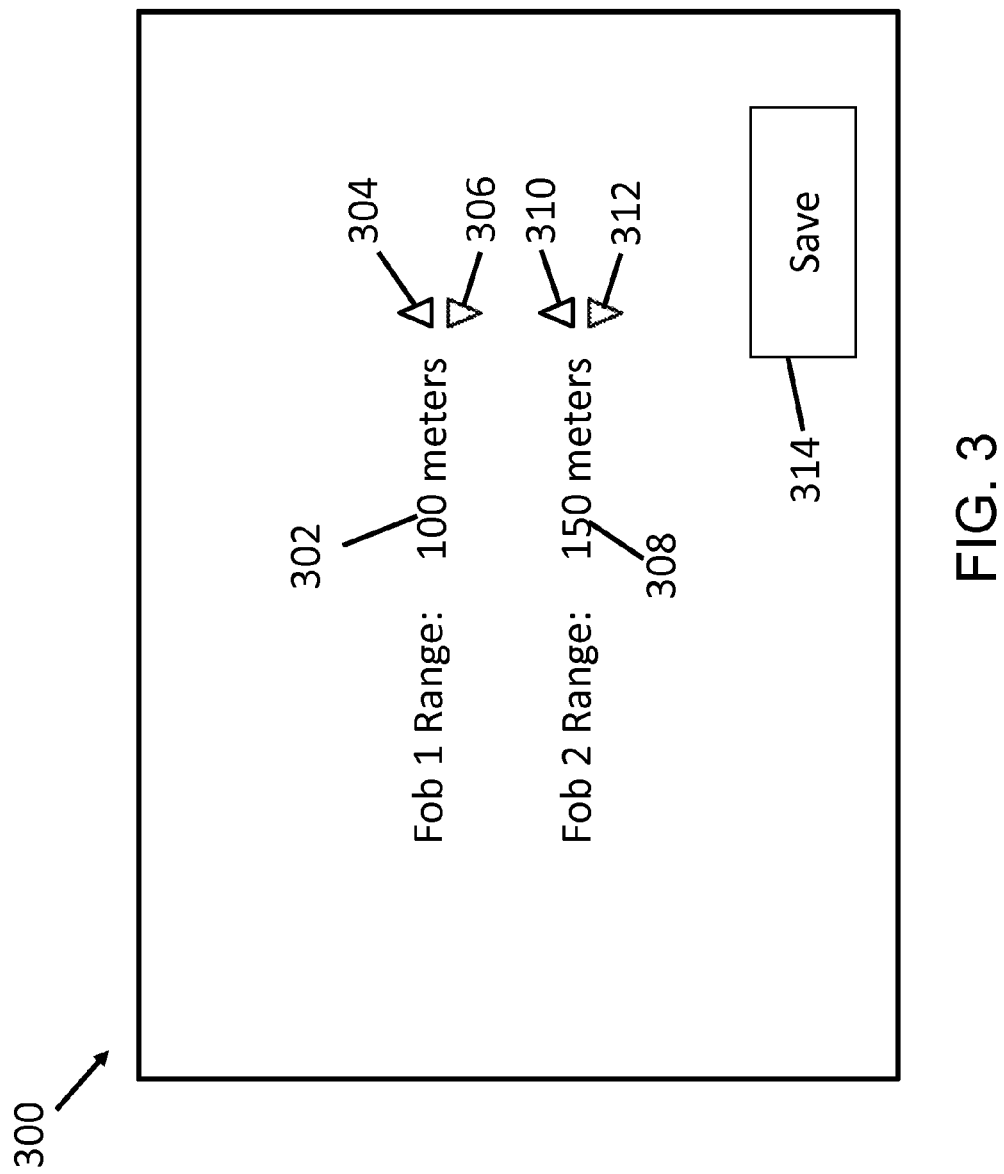
FIG. 3 is a screen shot of an example user interface that may be displayed by a display device in the vehicle of FIG. 1, in accordance with one aspect of the present disclosure.

FIG. 3 is a screen shot of an example user interface 300 that may be displayed by display device 128 of vehicle 106 (FIG. 1), in accordance with one aspect of the present disclosure. User interface 300 enables a user 201 (FIG. 2), for example an owner or driver of vehicle 106, a manufacturer of vehicle 106, or a maintenance person, to designate first range 130 for first key fob 102 and to designate second range 132 for second key fob 104. User interface 300 includes a first indication 302 of first range 130. Additionally, user interface 300 includes a first increase button 304 and a first decrease button 306. When first increase button 304 is activated, computing device 120 (FIG. 1) increases first indication 302 by a predetermined amount, for example 50 meters. When first decrease button 306 is activated, computing device 120 (FIG. 1) decreases first indication 302 by the predetermined amount. Likewise, user interface 300 includes a second indication 308 of second range 132, a second increase button 310, and a second decrease button 312. When second increase button 310 is activated, computing device 120 increases second indication 308 by the predetermined amount. Likewise, when second decrease button 312 is activated, computing device 120 decreases second indication 308 by the predetermined amount.

In some implementations, first indication 302 and second indication 308 may be adjusted from 50 meters to 1000 meters. In some implementations, rather than displaying a numerical distance as first indication 302 and second indication 308, user interface 300 displays descriptive terms such as "short", "medium", and "long". User interface 300 additionally includes a save button 314. When save button 314 is activated, computing device 120 stores the first indication 302 for first range 130 and the second indication 308 for second range 132 in memory 210. Subsequently, computing device 120 transmits a signal corresponding to first range 130 to first key fob 102 and transmits second signal corresponding to second range 132 to second key fob 104, as described herein.

In some implementations, user interface 300 displays only one of first indication 302 and second indication 308, rather than both first indication 302 and second indication 308. More specifically, in some implementations, computing device 120 may operate in a mode in which settings pertaining to a single user 201 or key fob 102, 104 are to be displayed and/or changed. In some implementations, after save button 314 is activated, computing device 120 additionally causes user interface 300 to display a message prompting user 201 to transmit an operational command signal to vehicle 106. Accordingly, after an operational command signal including an operational command is transmitted to vehicle 106, corresponding key fob 102, 104 receives the signal corresponding to the designated range, as described above. Additionally, in some implementations, computing device 120 controls transceiver 126 of vehicle 106 to transmit communications to first key fob 102 and second key fob 104 at power levels corresponding with the designated ranges associated with each of first key fob 102 and second key fob 104.

Figure 4:
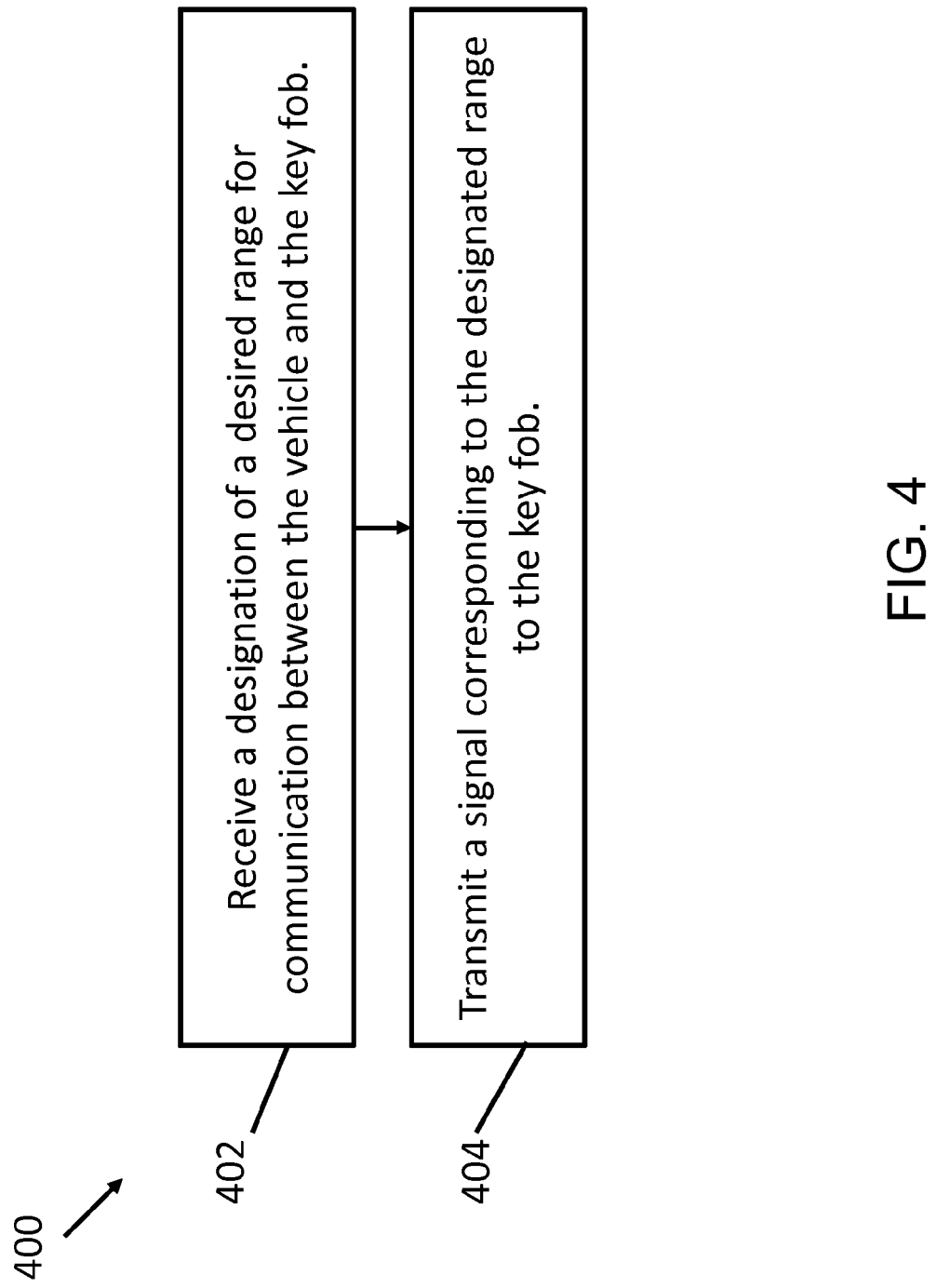
FIG. 4 is a flow chart of an example process for providing a selectable range for communication between at least one key fob of FIG. 1, and the vehicle of FIG. 1, in accordance with one aspect of the present disclosure.

FIG. 4 is a flow chart of an example process 400 for selecting a range for communication between a key fob (e.g., first key fob 102), and vehicle 106 (FIG. 1), in accordance with one aspect of the present disclosure. Initially, computing device 120 (FIG. 1) receives 402 a designation of a desired range for communication between vehicle 106 and the key fob (e.g., first key fob 102). For example, user 201 may designate the range (e.g., first range 130) by increasing or decreasing indication 302 on user interface 300 (FIG. 3). In other implementations, the range (e.g., first range 130) is designated through a diagnostic tool (not shown). Next, computing device 120 transmits 404 a signal corresponding to the designated range (e.g., first range 130) to the key fob (e.g., first key fob 102). For example, computing device 120 may receive a status fetch command signal from first key fob 102 and computing device 120 may transmit the signal corresponding to the designated range to first key fob 102 in a status fetch response signal. In some implementations, computing device 120 transmits the signal corresponding to the designated range as a bit included in a payload of the status fetch response signal.

Figure 5:
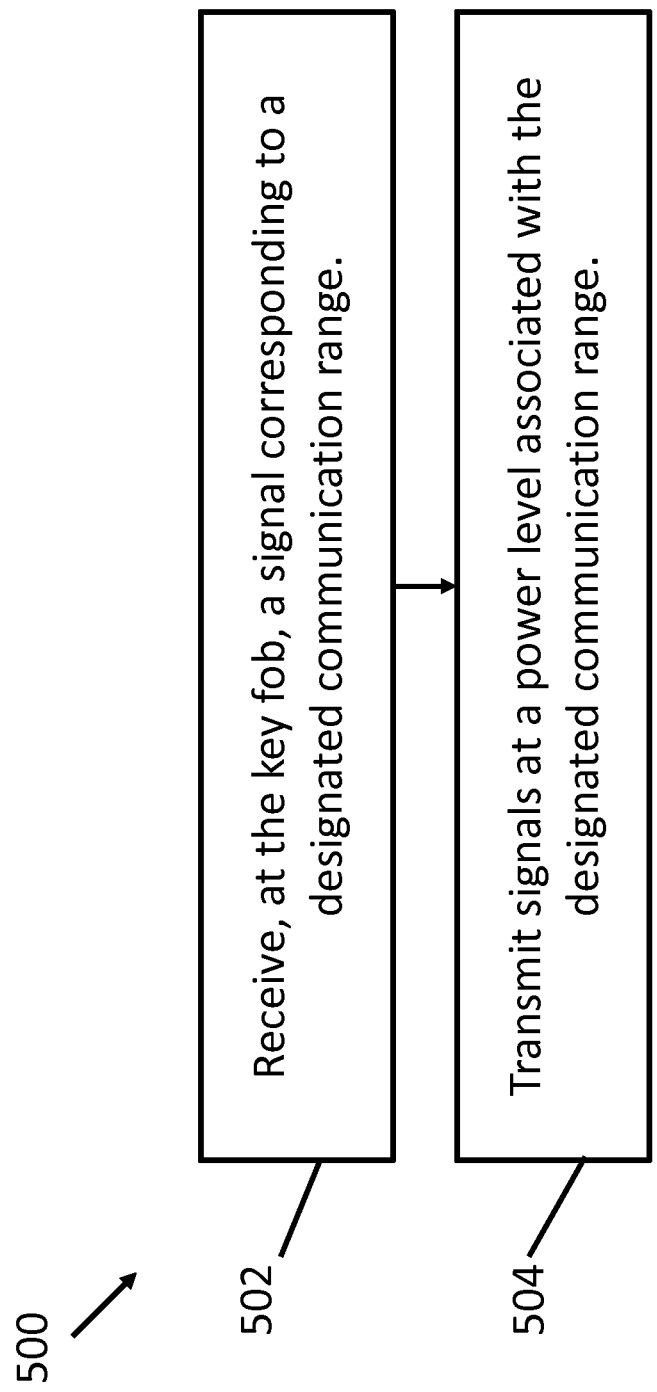
FIG. 5 is a flow chart of an example process for configuring a key fob of FIG. 1 to transmit and receive at a designated range, in accordance with one aspect of the present disclosure.

FIG. 5 is a flow chart of an example process 500 for configuring a key fob (e.g., first key fob 102) to transmit signals at a designated range, in accordance with one aspect of the present disclosure. Initially, key fob 102 receives 502, from a vehicle (e.g., vehicle 106 (FIG. 1)) a signal corresponding to a designated communication range. For example, the designated range may correspond to indication 302 (FIG. 3). Subsequently, key fob 102 transmits 504 signals at a power level associated with the designated communication range. For example, computing device 108 may control transceiver 112 to transmit at a power level associated with the designated communication range.

The methods and systems described herein may be implemented using computer programming or engineering techniques including computer software, firmware, hardware or any combination or subset thereof, wherein the technical effect may include at least one of: (a) receiving a designation of a desired range for communication between a vehicle and a key fob; (b) transmitting a signal corresponding to the designated range to the key fob; (c) receiving, at a key fob, a signal corresponding to a designated communication range; and (d) transmitting signals at a power level associated with the designated communication range.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 205, including RAM memory, ROM memory, EPROM memory, EEPROM memory, and non-volatile RAM (NVRAM) memory. The above memory types are example only, and are thus not limiting as to the types of memory usable for storage of a computer program.

While example systems and methods have been described above in association with one or more key fobs, it should be understood that any other portable device capable of performing the above-described functions may be used instead of a key fob.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

As compared to known systems and methods for two-way wireless communication between a key fob and a vehicle, the systems and methods described herein enable the key fob to communicate at a user-selectable range. Accordingly, a first user who prefers to have an increased range at the expense of expected battery life may configure a first key fob accordingly, whereas a second user who prefers to have a decreased range and increased expected battery life may configure a second key fob accordingly.

Example embodiments of systems and methods for providing a selectable range for communication between a key fob and a vehicle are described above in detail. The systems and methods described herein are not limited to the specific embodiments described herein, but rather, components of the systems and/or steps of the methods may be utilized independently and separately from other components and/or steps described herein.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computing device for use in selecting a range for communication between a key fob and a vehicle, said computing device located in the vehicle, said computing device configured to:
   receive, from a user at the computing device, a designation of a user-selected range for communication between the vehicle and the key fob, wherein the user-selected range is independent of any prior communication from the key fob;
   store the user-selected communication range; and
   transmit a signal corresponding to the user-selected range to the key fob, wherein the signal instructs the key fob to transmit signals at a specific power level based on the user-selected communication range, wherein the specific power level is independent of a current distance between the key fob and the vehicle, and wherein the key fob is configured to store the user-selected communication range for subsequent transmissions.

2. The computing device of claim 1, wherein said computing device is further configured to:
   receive a status fetch command signal from the key fob; and
   transmit the signal corresponding to the user-selected communication range in a status fetch response signal to the key fob.

3. The computing device of claim 2, wherein said computing device is further configured to transmit the signal corresponding to the user-selected communication range as a bit in a payload of the status fetch response signal.

4. The computing device of claim 1, wherein said computing device is further configured to receive the designation from an input device that is at least one of removably and wirelessly coupled to said computing device.

5. The computing device of claim 1, wherein said computing device is further configured to store, in a memory coupled to said computing device, the user-selected communication range.

6. The computing device of claim 1, wherein the key fob is a first key fob of a plurality of key fobs and said computing device is further configured to store, in a memory coupled to said computing device, the user-selected communication range associated with the first key fob and not associated with any other key fobs of the plurality of key fobs.

7. The computing device of claim 6, wherein the designation is a first designation, wherein the user-selected communication range is a first user-selected communication range, and wherein said computing device is further configured to:
   receive a second designation of a second range for communication between the vehicle and a second key fob of the plurality of key fobs; and
   transmit a signal corresponding to the second user-selected communication range to the second key fob.

8. The computing device of claim 1, wherein said computing device is further configured to display, on an output device coupled to said computing device, an indication of the user-selected communication range.

9. The computing device of claim 1, wherein said computing device is further configured to receive a designation of a range by receiving a designation of a range through a display device coupled to said computing device.

10. A method for use in selecting a range for communication between a key fob and a vehicle, said method comprising:
    receiving, at the key fob from the vehicle, a signal corresponding to a user-selected communication range for communication between the vehicle and the key fob, wherein the user-selected communication range is independent of any prior communication from the key fob;
    storing, in the key fob, the user-selected communication range for subsequent transmissions; and
    transmitting, from the key fob to the vehicle, signals at a specific power level based on the user-selected communication range, wherein the specific power level is independent of a current distance between the key fob and the vehicle.

11. The method of claim 10, wherein transmitting signals at the power level further comprises limiting power consumed by a transceiver in the key fob to a value associated with the user-selected communication range.

12. The method of claim 10, further comprising transmitting an operational command signal to the vehicle at the user-selected communication range.

13. The method of claim 10, further comprising transmitting, by the key fob, a status fetch command signal to the vehicle.

14. The method of claim 13, wherein receiving the signal corresponding to the user-selected communication range further comprises receiving a status fetch response signal from the vehicle.

15. The method of claim 13, wherein receiving the signal corresponding to the user-selected communication range further comprises receiving a payload in a status fetch response signal, wherein the payload includes a bit corresponding to the user-selected communication range.

16. A key fob comprising:
- a transceiver configured to transmit and receive signals; and
- a processor coupled to said transceiver and configured to:
  - receive, from a vehicle, a user-selected communication range for communication between the vehicle and the key fob, wherein the user-selected communication range is independent of any prior communication from the key fob;
  - store, in the key fob, the user-selected communication range for subsequent transmissions; and
  - control a specific power level at which said transceiver operates based at least partially on the user-selected communication range, wherein the specific power level is independent of a current distance between the key fob and the vehicle.

17. The key fob of claim 16, wherein said processor is further configured to transmit an operational command signal to the vehicle at the user-selected communication range.

18. The key fob of claim 16, wherein said processor is further configured to transmit a status fetch command signal to the vehicle.

19. The key fob of claim 18, wherein said processor is further configured to receive a signal corresponding to the user-selected communication range in a status fetch response signal from the vehicle.

20. The key fob of claim 18, wherein said processor is further configured to receive a payload in a status fetch response signal from the vehicle, wherein the payload includes a bit corresponding to the user-selected communication range.

* * * * *